July 8, 1969 L. E. RETHWISCH 3,453,842
UNIVERSAL COUPLINGS
Filed Sept. 7, 1967 Sheet 1 of 2

INVENTOR
LLOYD E. RETHWISCH
BY
EDWARD D. O'BRIAN
ATTORNEY

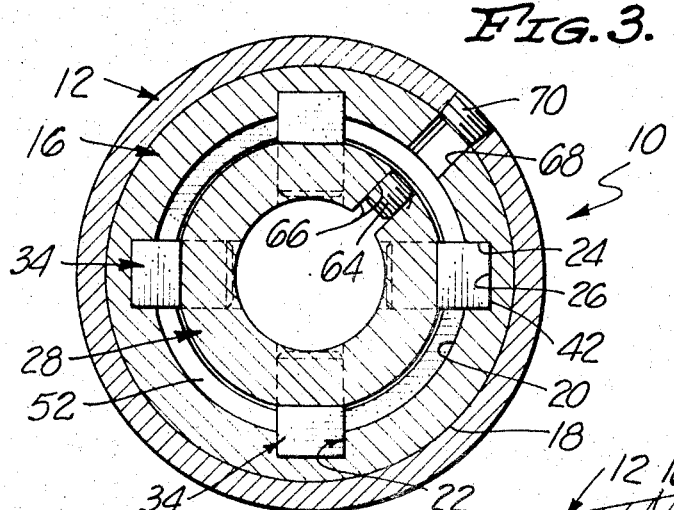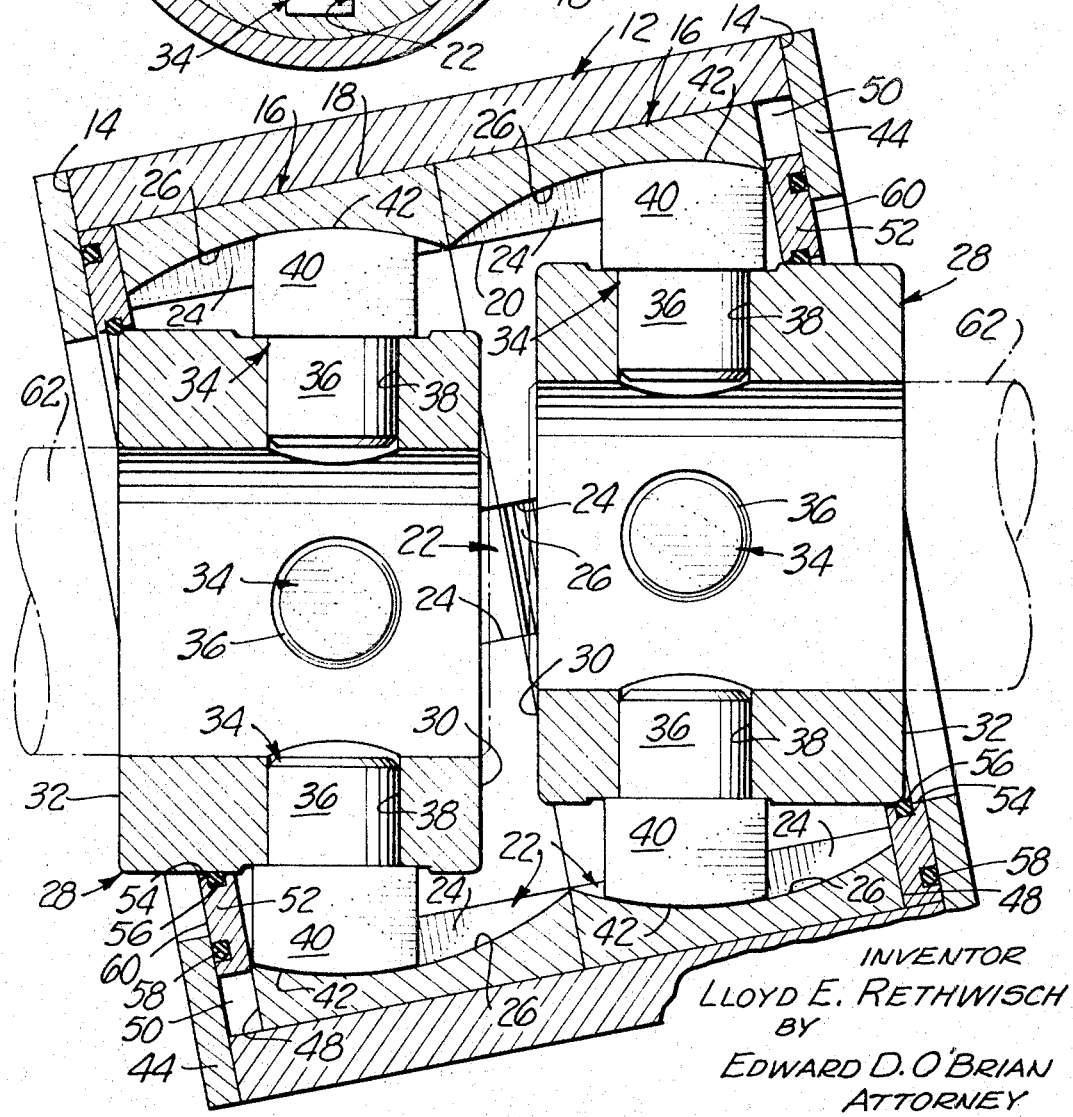

United States Patent Office 3,453,842
Patented July 8, 1969

3,453,842
UNIVERSAL COUPLINGS
Lloyd E. Rethwisch, 3127 W. Graciosa,
Anaheim, Calif. 92804
Filed Sept. 7, 1967, Ser. No. 666,100
Int. Cl. F16d 3/18, 3/54, 3/04
U.S. Cl. 64—9
2 Claims

ABSTRACT OF THE DISCLOSURE

A universal coupling is disclosed which has an open-ended housing within which there are located alignment sections. Each of these sections is cylindrical and provided with a plurality of interior slots, the bottoms of which are arcuate and are centered about a common point on the axis of each section. A shaft holder is located within each of the alignment sections; a plurality of shoes shaped to fit and move within said slots are held by the shaft holders so as to each fit within one of the slots. Seal means are located at the ends of the housing next to the surfaces of the alignment sections remote from one another.

Background of the invention

So-called universal type shaft couplings have been known and used for many years. Such couplings are intended to be used in transmitting rotation from one shaft to another shaft. These couplings are normally constructed so that various types of shaft misalignment can be accepted and handled by the coupling.

The number of types of various different shaft couplings which have been developed and used is extremely large. Some of such couplings have relied upon resilient and/or flexible material in order to transmit rotation between two different parts such as either two different shafts of two different parts of a coupling. For some purposes couplings of this category are satisfactory. For other purposes other more specialized universal type shaft couplings are desired. This is particularly the case when it is considered that flexible and/or resilient material will not take substantial wear.

With these other couplings there have been various problems which have tended to limit or restrict their use and/or acceptability. One of these problems concerns backlash. Another concerns the desirability of obtaining constant or substantially constant velocity with the two shafts employed. Various other type problems have, of course, been encountered with various coupling structures. Frequently certain of these problems have been encountered in a specific coupling, but other problems have not been significant in such a coupling.

Summary of the invention

An object of the present invention is to provide new and improved universal type couplings for joining two different shafts so that rotation may be transmitted between them. Another generalized object of the invention is to provide flexible couplings of the type indicated which overcome various problems and limitations of prior related structures as are briefly indicated in the preceding.

Further objects of the present invention are to provide flexible couplings such as may be referred to as universal couplings which may be constructed at a comparatively nominal cost, which are reliable in use, which may be serviced as needed, and which when used provide a constant or substantially constant output velocity. Related objects of the present invention are to provide universal couplings having very acceptable backlash characteristics and which can be satisfactorily employed with various shafts which are misaligned in a variety of different ways.

In accordance with this invention, these objectives are achieved in a universal coupling for transmitting rotation from one shaft to aonther, having an open-ended housing, what are referred to herein as alignment sections located within the housing, each of the alignment sections being cylindrical and having a plurality of slots located in its interior. Each of these slots extends parallel to the axis of the section in which it is located and is provided with an arcuate bottom. Within each of these sections, there is located a shaft holder supporting a plurality of shoes, each of which shoes is located in one of the slots so as to be movable within this slot. In the preferred construction shown angular groove-like cavities are located at the ends of the alignment sections remote from one another. Movable seals in the nature of shields are located within these angular cavities.

Brief description of the drawings

The invention is best more fully described by referring to the accompanying drawing in which:

FIG. 3 is a cross-sectional view taken at line 3—3 of FIG. 2;

FIG. 4 is a cross-sectional view similar to FIG. 2 showing how the coupling illustrated in the preceding figures can accommodate a type of shaft misalignment.

Description of the preferred embodiment

Figure 1:
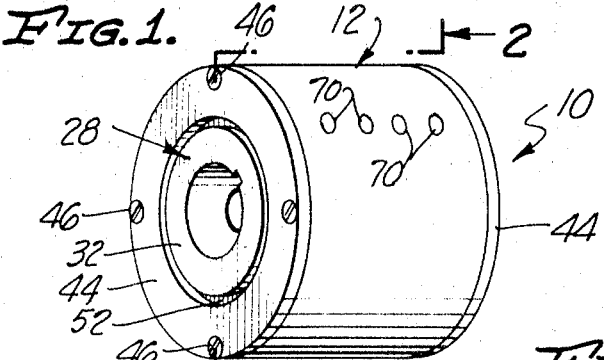
FIG. 1 is a view showing an end and a side of a coupling of this invention.
Figure 2:
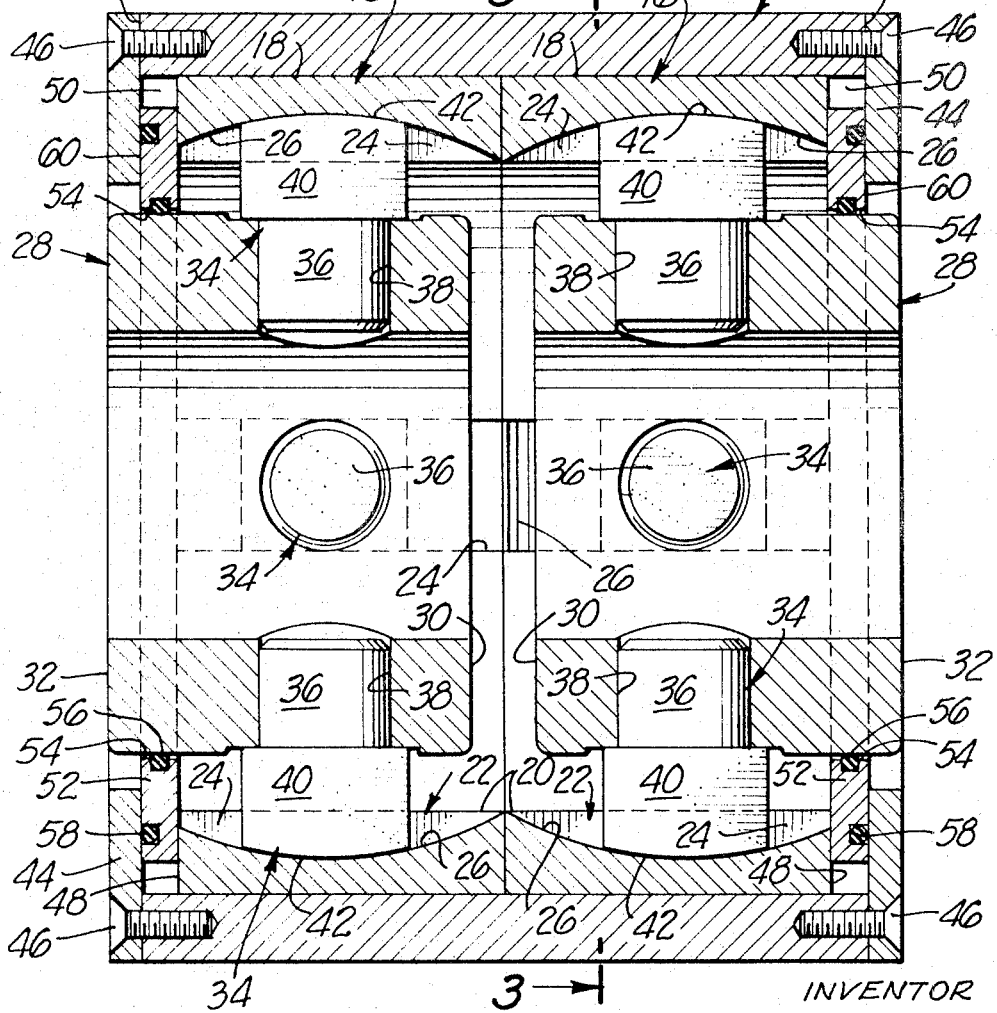
FIG. 2 is a cross-sectional view taken at line 2—2 of FIG. 1.

In the drawing, there is illustrated a coupling 10 constituting a presently preferred embodiment or form of the invention. This coupling 10 has a cylindrical external housing 12 having open ends 14. Within the interior of the housing 12 there are located what are referred to herein as alignment sections 16. These sections 16 are identically formed; each of the sections 16 is ring-like in character and has a cylindrical external wall 18 adapted to fit closely within the interior of the housing 12. The adjacent ends of these sections 16 are secured together in any desired manner so that there is no relative rotation between them. This may be accomplished by bonding the adjacent surfaces of the sections 16 to one another.

Each of the sections 16 also has a concentric cylindrical interior wall 20 provided with a plurality of interior slots 22. These slots 22 are preferably formed so that they are all identical. Preferably the slots 22 are spaced equidistant from one another around the interior of the wall 20. It will be noted that in the embodiment of the coupling 10 illustrated that in each of the sections 16 there are four of these slots located 90° apart from one another around the axis of the interior wall 20. Each of the slots 22 has parallel side walls 24 extending in a direction parallel to this axis.

Each of the slots 22 also has an arcuate bottom wall 26. All of the bottom walls 26 in a section 16 are preferably formed so that they are curved in order to extend about the same center of rotation located upon the axis of the cylindrical wall 20. It will be noted that these bottom walls 26 are planar in character and thus can be considered as segments of cylindrical walls. This particular planar configuration is considered to facilitate the construction of the complete coupling 10.

Within each of the sections 16 there is located what is referred to herein as a shaft holder 28. These shaft holders are cylindrical and have adjacent ends 30 spaced far enough from one another so that there is no danger of these ends contacting one another during the use of the coupling 10. The holders 28 also have other ends 32 located remote from one another which extend a comparatively short distance past the ends 14 of the housing.

Each of the holders 28 carries a shoe 34 corresponding to one of the slots 22. These shoes 34 preferably have shaft-like bases 36 which are rotatably mounted with correspondingly shaped holes 38 in the holders 28. Each of the shoes 34 also preferably includes flat, parallel side walls 40 which are adapted to fit between and slide along the walls 24. Also each of the shoes 34 includes an arcuate end wall 42 or bottom preferably having the same configuration as a corresponding bottom wall 26. It will be noted that these end walls 42 fit against the bottom walls 26.

The coupling 10 also includes ring-like end plates 44 secured the end 14 by small screws 46 so as to define within these ends at the ends 48 of the sections 16 small annular groove-like cavities 50. Each of these cavities contains a movable ring or washer-like shield or seal 52 of smaller diameter than the interior of the housing 12. It will be noted that the interior wall 54 of each seal 52 is only slightly larger than the exterior of a holder 28 and that each seal 52 fits around one of the holders 28. A conventional small sealing ring 56 may be located within the wall 54 so as to form a seal against a holder 28. Another similar conventional sealing ring 58 may be located in an end wall 60 of the seal 52 so as to continuously form a seal with respect to the corresponding end plate 44.

The various parts of the coupling 10 hereinbefore described may be easily separately manufactured using conventional equipment and techniques. When so manufactured these various parts may be similarly assembled. Once they are assembled the entire structure 10 may be used to connect two shafts such as the shafts 62 indicated in phantom in FIG. 4 of the drawing.

Each of the shafts 62 should preferably be of a dimension enabling it to fit closely within one of the holders 28. When inserted within these holders 28 the shafts 62 may be tightened in place utilizing conventional set screws 64 within threaded openings 66 in the holders 28. Other conventional manners of holding the shafts 62 can be employed. Acess to these set screws 64 may be gained through openings 68 in the housing 12 of the sections 16. These latter openings are preferably closed by small plugs 70. They will be used for lubrication purposes as desired.

Once assembled in this manner, the coupling 10 will transmit rotation between the shaft 62 even if there is a significant misalignment as indicated in FIG. 4 of the drawing of these shafts. The structure of the coupling 10 is such that it will accommodate angular, parallel or lateral misalignment of the shafts with which this coupling 10 is used. It will be realized how the coupling 10 is advantageous as far as backlash is concerned. Probably however, the most important feature of the coupling 10 is the fact that with this coupling rotation is transferred at either a constant or substantially a constant angular velocity.

From a consideration of the above it will also be realized that the seals 52 will move within the cavities 50 to accommodate shaft misalignment because of contact with the shaft holders 28. As they move they continuously fit within the cavities 50 so that a seal is constantly maintained. This is advantageous in keeping out contamination which might damage the coupling 10, and, if used, in keeping lubricating fluid within the housing 12.

Those skilled in the art of the design of machine components such as couplings will realize that changes may be made in the precise coupling shown without changing the basic character of this structure. As an example of this a coupling can be formed in which one of the alignment sections 16 and its corresponding shaft holder 28 is omitted, and in which the housing 12 can be directly attached to a shaft (not shown) by conventional means. For this reason, the drawings are not to be considered as limiting the invention in any respect, and invention is to be considered as being limited solely by the appended claims.

I claim:
1. A coupling for use in transmitting rotation between two shafts which comprises:
   a housing having a first and a second attached alignment section located therein and having an open end,
   said alignment sections each having a cylindrical interior and said interiors having a common axis,
   the interior of each of said alignment sections having four interior slots located therein,
   said slots within said sections being located generally parallel to the axes of said sections,
   said slots within each of said sections being spaced 90° apart from one another around the interiors of said sections,
   each of the said slots having parallel side walls and an arcuate bottom wall,
   said bottom walls within said sections being curved about a point which is common for all of said bottom walls within each of said sections,
   a first shaft holder located within said first alignment section and a second shaft holder located within said second alignment section said shaft holders being spaced from and unattached to one another,
   said shaft holders each having an interior which is shaped so as to receive and hold a shaft,
   each of said shaft holders having a hole located in its periphery located adjacent to each of said slots,
   a shoe having a shaft like base fitting within each of said holes in said shaft holders so as to be rotatably mounted on said shaft holders, said shoes resting against the exteriors of said shaft holders.
   each of said shoes fitting within and capable of moving within one of said slots,
   said shoes each having parallel side walls located against the side walls of one of said slots and each having an arcuate bottom of the same shape as said arcuate bottom walls fitting against one of said arcuate bottom walls.
2. A coupling as claimed in claim 1 including:
   annular grooves located within the ends of said housing adjacent said alignment sections,
   a ringlike seal member located within each of said grooves so as to be capable of movement therein,
   said seal members engaging the exterior of said holders.

References Cited
UNITED STATES PATENTS

| | | | |
|---|---|---|---|
| 1,269,068 | 6/1918 | Evans | 64—7 X |
| 2,117,706 | 5/1938 | Cutting | 64—7 |
| 2,329,903 | 9/1943 | Horne | 64—21 |
| 2,555,921 | 6/1951 | Davis | 64—8 X |
| 3,016,721 | 1/1962 | Davis | 64—21 |
| 3,327,497 | 6/1967 | Amend et al. | 64—9 |

HALL C. COE, *Primary Examiner.*

U.S. Cl. X.R.

64—31